US007735754B2

(12) United States Patent
Marelli et al.

(10) Patent No.: US 7,735,754 B2
(45) Date of Patent: Jun. 15, 2010

(54) FLAT ATOMIZER PUMP

(75) Inventors: Andrea Marelli, Milan (IT); Oscar Faneca Llesera, Barcelona (ES); Victor Ribera Turro, Barcelona (ES)

(73) Assignee: Meadwestvaco Calmar, Inc., Grandview, MO (US)

(*) Notice: Subject to any disclaimer, the term of this patent is extended or adjusted under 35 U.S.C. 154(b) by 0 days.

(21) Appl. No.: 12/281,341

(22) PCT Filed: Mar. 2, 2007

(86) PCT No.: PCT/US2007/063179

§ 371 (c)(1), (2), (4) Date: Oct. 3, 2008

(87) PCT Pub. No.: WO2007/103789

PCT Pub. Date: Sep. 13, 2007

(65) Prior Publication Data

US 2009/0020627 A1 Jan. 22, 2009

(30) Foreign Application Priority Data

Mar. 2, 2006 (ES) ................................ 200600505

(51) Int. Cl.

| | |
|---|---|
| ***B05B 9/043*** | (2006.01) |
| ***B05B 1/34*** | (2006.01) |
| ***B67D 7/58*** | (2010.01) |
| ***B67D 7/60*** | (2010.01) |
| ***G01F 11/00*** | (2006.01) |

(52) U.S. Cl. .................... 239/333; 239/463; 222/383.1; 222/321.7; 222/336; 222/340

(58) Field of Classification Search ................. 239/302, 239/309, 333, 349, 463, 487, 488; 222/80, 222/82, 321.1, 321.6, 321.7, 336, 340, 383.1, 222/385; 283/56

See application file for complete search history.

(56) References Cited

U.S. PATENT DOCUMENTS

| | | | | |
|---|---|---|---|---|
| 5,590,815 | A * | 1/1997 | Montaner et al. | 222/82 |
| 5,950,871 | A * | 9/1999 | de Pous et al. | 222/88 |
| 2003/0000962 | A1* | 1/2003 | Duquet et al. | 222/107 |
| 2003/0071076 | A1* | 4/2003 | Tenzer et al. | 222/385 |
| 2005/0230425 | A1* | 10/2005 | Genosar | 222/207 |
| 2005/0260090 | A1* | 11/2005 | Stark et al. | 417/559 |

FOREIGN PATENT DOCUMENTS

| | | |
|---|---|---|
| EP | 0753353 | 1/1997 |
| WO | WO2005/045292 | 5/2005 |

* cited by examiner

*Primary Examiner*—Darren W Gorman

(57) ABSTRACT

A flat pump for producing liquid spray or for producing an atomized liquid stream may have a thickness of 6 millimeters or less. The flat pump may include an internal reservoir (3), a valve (19), a valve conduit (45) and a vortex chamber (49) wherein fluid from the reservoir may be pumped through the valve, along the valve conduit, and into the vortex chamber. An atomized liquid stream, spray, or mist formed in the vortex chamber may be expelled from the flat pump.

21 Claims, 14 Drawing Sheets

FLAT ATOMIZER PUMP

CROSS-REFERENCE TO RELATED APPLICATIONS

This application claims the benefit of, and incorporates by reference herein in its entirety, Spanish Application 200600505, entitled “BOMBA PULVERIZADORA APPLANADA” which was filed on Mar. 2, 2006.

BACKGROUND

1. Field of the Invention

The present invention relates to atomizer pumps capable of pumping liquids contained in a reservoir and expelling such liquids in an atomized form and more particularly to flat atomizer pumps for dispersing a liquid.

2. State of the Art

Atomizer pumps and dispensers are known and used for pumping colognes, perfumes, and/or cosmetic products in general. There are a variety of conventional designs where the atomizer pumps are mounted on a reservoir and the pumps are capable of pumping and atomizing liquid contained in the reservoir.

Manufacturers of cosmetic products are often interested in manufacturing small packages with very small amounts of the product. For example, manufactures often desire to distribute free samples of products so that consumers may test or try the product before making a purchase of the product. The manufacturing of small pumps and small sample containers, however, is very complex and can be prohibitively expensive. In most instances, the manufacturers would like to be able to provide a low-cost sample solution while maintaining aesthetic attractiveness which is desirable to the consumer as well. However, it can be difficult to manufacture small pumps and sample packages while keeping the costs in a range that is feasible for producing and distributing free, or low-cost, samples.

In some instances, manufactures have created samples which have an identical or a very similar general appearance to the original packaging of the product that they are sampling. While this may be an attractive solution because the consumer is able to readily identify the sample from the packaging, it is often a costly solution that requires complex and expensive manufacturing and distribution of the samples.

Therefore, it may be desirable to develop new pumps which may be used for sampling and which may offer a lower-cost alternative to conventional sampling solutions. In addition, it may be desirable to develop a new pump which may be easily distributed and may be distributed at a lower-cost than convention sample pumps or small pumps.

BRIEF SUMMARY OF THE INVENTION

According to certain embodiments of the invention, a flat fluid dispenser may include a dispenser body and an actuator. The dispenser body may be flat and may be formed from one or more molded plastic parts. In some embodiments, the dispenser body may have a thickness of 6 millimeters or less, and even 3.5 millimeters or less. The dispenser body may include a reservoir, a valve, a tube in communication with the reservoir and the valve, and a pump chamber. The reservoir may be formed by folding at least a portion of the dispenser body over and onto a second portion of the dispenser body and welding the body. In other embodiments, the reservoir may be formed by welding a reservoir cap onto a reservoir opening in a molded plastic body. The welded body parts may form a reservoir. The reservoir may also include one or more sealable openings that may be used to fill the reservoir before sealing the reservoir. The valve may include any valve capable of controlling or regulating the flow of liquids through the valve.

An actuator according to embodiments of the invention may include a fluid conduit, a vortex, and an orifice. The fluid conduit and vortex may be contained within a tubular portion of the actuator wherein the tubular portion is in communication with the pump chamber of the dispenser body. In some embodiments, the fluid conduit and vortex may be formed in a spring and rod inserted in the tubular portion of the actuator. The fluid conduit may deliver fluid from the pump chamber to the vortex and the vortex may disperse fluid through the orifice. The orifice may include one or more orifices in the tubular portion of the actuator.

Actuators according to embodiments of the invention may be substantially flat and may have a thickness of less than 6 millimeters, or even less than 3.5 millimeters. The actuators according to embodiments of the invention may be formed from one or more molded plastic parts. In some embodiments, an actuator shroud defining a tubular section, an orifice, and notches may be combined with a fluid conduit component having a fluid conduit and a vortex chamber. An actuator may be fitted to the dispenser body and relatively secured thereto with the notches or other securing devices.

According to particular embodiments of the invention, a flat dispenser may be filled with a fragrance such as a perfume or cologne. The flat dispenser may be distributed as a sample. In some embodiments, the flat dispenser and fluid may be sealed in a foil, plastic, or other liquid impermeable pouch or bag. The pouch and dispenser with fluid may be inserted into magazines, newspapers, periodicals, or other circulars as fluid samples.

BRIEF DESCRIPTION OF THE SEVERAL VIEWS OF THE DRAWINGS

While the specification concludes with claims particularly pointing out and distinctly claiming some embodiments which are regarded as the invention, the features of various embodiments of the invention can be more readily ascertained from the following detailed description of the invention when read in conjunction with the accompanying drawings, in which:

DETAILED DESCRIPTION OF THE INVENTION

Figure 1:
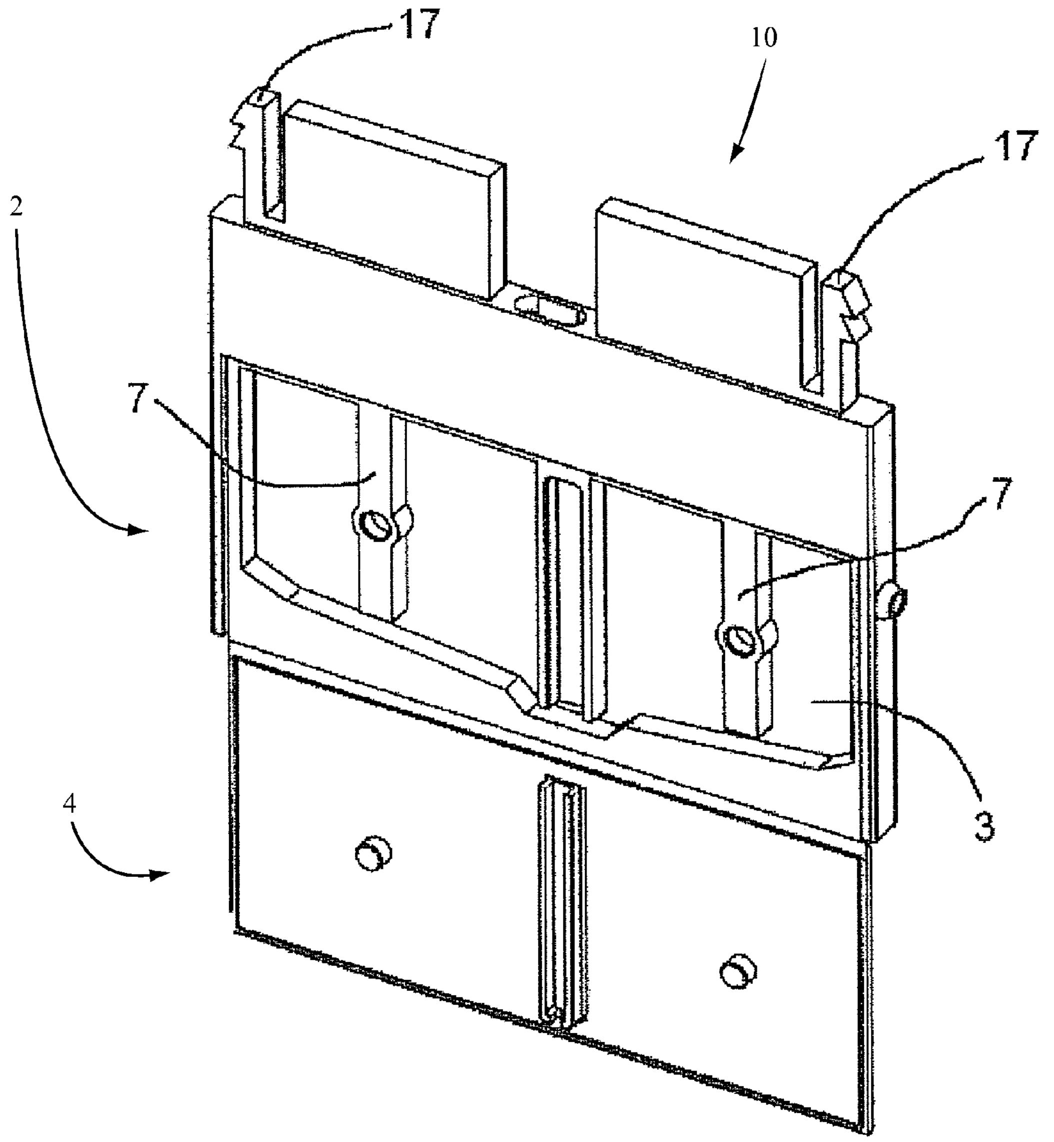
FIG. 1 illustrates a perspective view of a first component of a dispenser according to particular embodiments of the invention.

A pump or dispenser according to embodiments of the invention may include a flat pump wherein the thickness of the pump may be less than about 6 mm. In some embodiments of the invention, the thickness of the pump may be less than about 4 mm or even less than about 3.5 mm. For example, a pump or dispenser for distributing samples of perfume in magazines may have a thickness of about 3 mm or less in order to meet the requirements for magazine inserts. In some embodiments, however, the thickness of the flat pump may be greater than 6 mm, for example in those instances where a larger pump is desired for a particular purpose.

In some embodiments of the invention, a flat pump or dispenser may include a pump having a first cross-sectional dimension greater than a second cross-sectional dimension measured perpendicularly to the first cross-sectional dimension. In certain embodiments, the first cross-sectional dimension may be much greater than the second cross-sectional dimension. For example, a first cross-sectional dimension which is much greater than a second cross-sectional dimension may include a ratio of the first cross-sectional dimension to the second cross-sectional dimension of about 5 to 1 to about 10 to 1. The ratio of the first cross-sectional dimension to the second cross-sectional dimension may also be smaller than 5 to 1 or larger than 10 to 1 and even equal to or more than 15 to 1.

According to various embodiments of the invention, a flat pump may include a first component forming a reservoir capable of containing a liquid to be pumped or atomized. The first component may also include a pump chamber which may include a tubular section passing through at least a portion of the first component. A tube, such as a dip tube, may be integrated with, a part of, or added to the first component to deliver a fluid from the reservoir to the pump chamber. The first component may also include a valve such as a ball valve or a flap valve that may be capable of regulating the flow of fluid between the reservoir and the pump chamber. The first component may be flat and the shape of the first component may be defined by two principal faces of the first component and a perpendicular thickness between the two faces. The first component may also include one or more snap-fit features for mating with a second component and retaining the second component with the first component.

The second component of a flat pump according to various embodiments of the invention may include a second tubular section, which may be a flattened tubular section, which may fit inside of or outside of the tubular section of the pump chamber of the first component. The combination of the tubular section of the first component and the second tubular section may form a complete pump chamber. In various embodiments, the second tubular section may be able to move relative to the tubular section of the first component. In addition, the second tubular section may include a sealing lip which may help seal the joint or moving joint between the second tubular section and the tubular section of the first component. Movement of the second tubular section with respect to the tubular section of the first component may act as a pump having an extended position and a retracted position and wherein the pump chamber may be filled with fluid by such relative motion. The second tubular section may also include a valve seat located along an internal portion of the second tubular section.

The second component may include spaces defined by second component walls that may fit around, in, or with the first component. The second component may also include one or more orifices located in a surface of the second component. Liquid, such as atomized liquid, may escape from an interior of the second tubular section out of the second component through an orifice.

A third component of a flat pump according to embodiments of the invention may include a rod or valve body which may be inserted in the second component and may be seated in a valve seat therein. For example, a portion of the third component may fit in the second tubular section of the second component such that at least portions of two surfaces of the rod or valve body are in contact with interior surfaces of the second tubular section. An exhaust valve may be defined in the third component between the rod or valve body and the valve seat. When the rod or valve body rests on the valve seat, a hermetic seal may be formed. A portion of the rod or valve body may also include a spring which may push the rod or valve body against the valve seat, thereby assisting with the hermetic seal between the valve body and the valve seat. The third component may also include a conduit through the valve body or along at least a portion of the valve body such that fluid may flow along the conduit. The third component may also include a vortex chamber in communication with the conduit. The vortex chamber may be defined or formed in at least a portion of the valve body and may be aligned with the orifice in the second component.

Various embodiments of the invention may also include a second spring that may force the displacement of the first component relative to the second component. The spring may act against both the first component and the second component, or against just one of the components, resulting in an extended position that may be retracted by applying forces to the first component, the second component, or both the first and second components.

The various components of embodiments of the invention may be made of any suitable material, for example, they may be made of a molded or moldable plastic or resin material.

While various embodiments of the invention include flat pumps, it is understood that a pump need not be completely flat. For example, a flat pump according to embodiments of the invention may also include pumps having slightly convex, slightly concave, elliptical, or other shapes or surfaces. For example, a pump having two opposing convex surfaces forming the first component of the pump will still be considered a flat pump according to certain embodiments of the invention if a first cross-sectional dimension of the pump is greater than a second, perpendicular, cross-sectional dimension of the pump.

Figure 2:
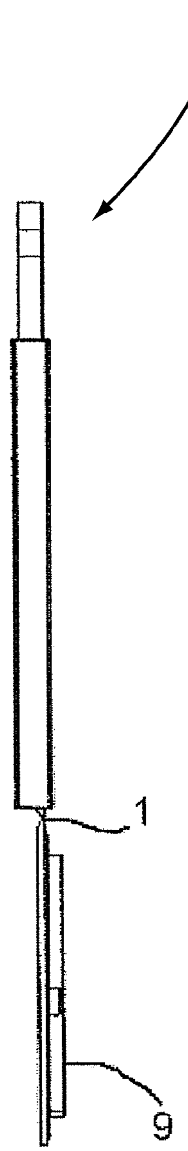
FIG. 2 illustrates a side view of a first component of a dispenser according to particular embodiments of the invention.
Figure 3:
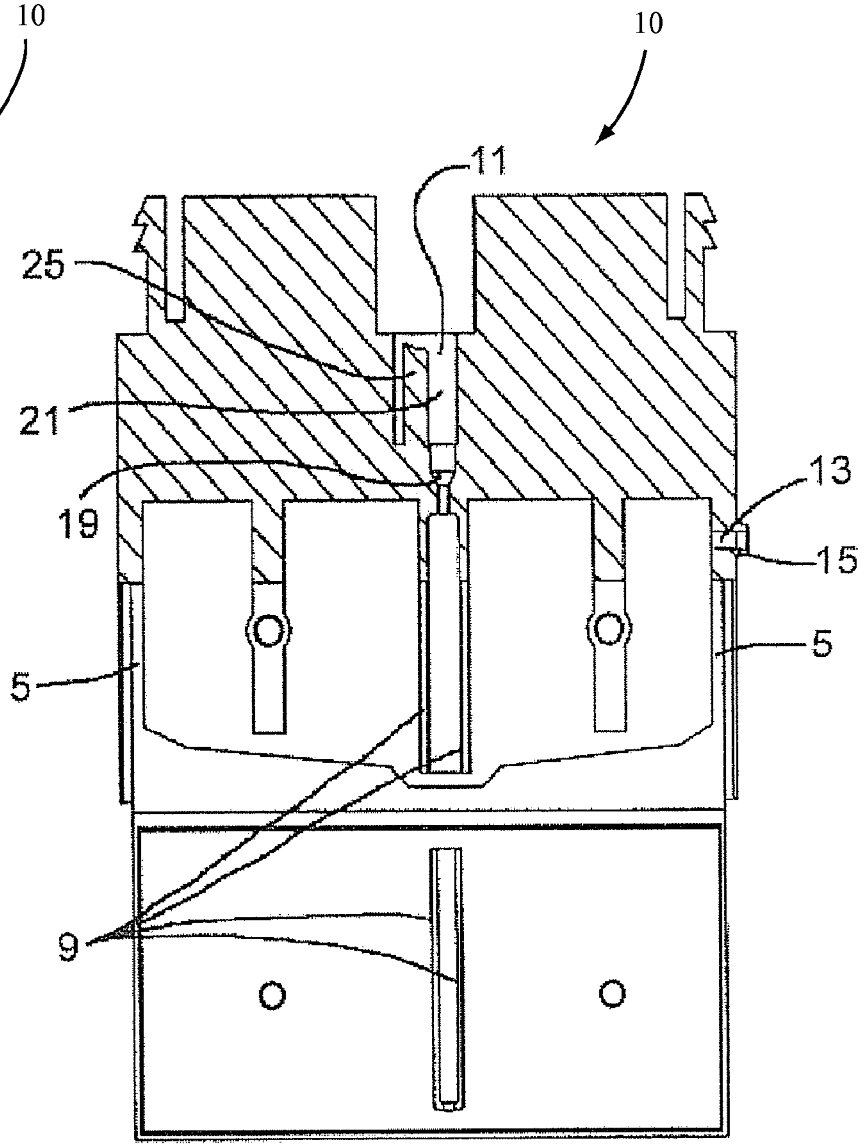
FIG. 3 illustrates a front view of a first component of a dispenser according to particular embodiments of the invention.

A flat pump according to various embodiments of the invention is illustrated in FIGS. 1 through 3. The first component 10, or body, of the flat pump may be formed by folding flat piece 4 along the length of folding line 1 to intersect section 2 of the first component 10. Once the flat piece 4 is folded, the intersection of the flat piece 4 and the section 2 may form a reservoir 3. The reservoir 3 may be defined in part by single-partition walls 5 of the first component 10. Other single-partition walls 7 may provide rigidity to the first component 10 and the reservoir and may prevent the reservoir 3 from being crushed, for example, when the reservoir 3 is exposed to a force such as the forces caused by the stacking of mass on top of the flat pump. The lower extreme of the reservoir 3 may be formed such that liquid in the reservoir 3 may accumulate near one of the tube walls 9 that may form a tube connecting a lower extremity of the reservoir 3 to a first tubular section 11 of the first component 10. A hermetic seal between the fold of the flat piece 4 and section 2, and between the various single-partition walls, may be obtained in various ways, including, for example, by using adhesives, thermowelding, ultrasonic welding, or the like. Formation of a hermetic seal forms various components of the flat pump.

For example, the first component 10 may be made from a single flat component which may be folded onto itself along the length of the folding line 1 to form various parts of the flat pump, including for example, the reservoir 3 and a tube formed by the tube walls 9. The integration of the various components of a pump into the first component 10 may reduce the costs associated with making the flat pump when compared to conventional pumps. In addition, the folding of the flat piece 4 along the folding line 1 may be easily performed using automated systems, allowing easy construction of the flat pump.

In some embodiments of the invention, the single-partition walls 7 may partially extend along a length of the reservoir 3 and they may run from one of the principal faces to the other. In other embodiments, the single-partition walls 7 may include various shapes which extend from one interior surface of the reservoir 3 to an opposite interior surface of the reservoir 3. The single-partition walls 7 may be designed and included in a flat pump to provide the necessary support needed to support the reservoir 3 of the flat pump and many different configurations and layouts are possible.

The tube walls 9 according to various embodiments of the invention may form a tube connecting the reservoir 3 with an intake valve 19. The formation of the tube from the tube walls 9 eliminates the need to assemble a dip tube into the flat pump. The elimination of the need for a dip tube may reduce manufacturing steps and costs.

The first component 10 may also include a lateral aperture 13 through which liquid may be introduced into the reservoir 3. The lateral aperture 13 may be formed completely in the section 2 of the first component 10 as a hole or may be formed with the flat piece 4 as it is folded onto the section 2 to form the reservoir 3. The lateral aperture 13 may also include a protruding flange 15, which may serve as a fill material for closing the lateral aperture 13 after the reservoir 3 has been filled.

The first component 10 may also include one or more arms 17. The arms 17 may be equipped with, or may include, one or more teeth or indentations that may be used to at least partially secure a second component to the first component 10.

A passageway, or intake valve 19, may be located in the first component 10 at an upper end of the tube walls 9. The intake valve 19 may regulate the flow of fluid from a tube formed by the tube walls 9 into a pump chamber 21 of the first component 10. The intake valve 19 may include a valve device, such as a ball valve, flap valve, or other valve, which may regulate the flow of liquid through the intake valve 19. For example, a ball 23 may be positioned in the intake valve 19 to regulate the flow of liquid from the reservoir 3 to the pump chamber 21. The ball 23 may also prevent the flow of fluid from the pump chamber 21 back into the reservoir 3.

A projection 25 may be included in the pump chamber 21. The projection 25 may include an upper extremity which is capable of perforating a sealing membrane in a second component of the flat pump.

The first component 10 may be relatively flat as illustrated in FIG. 2.

Figure 4:
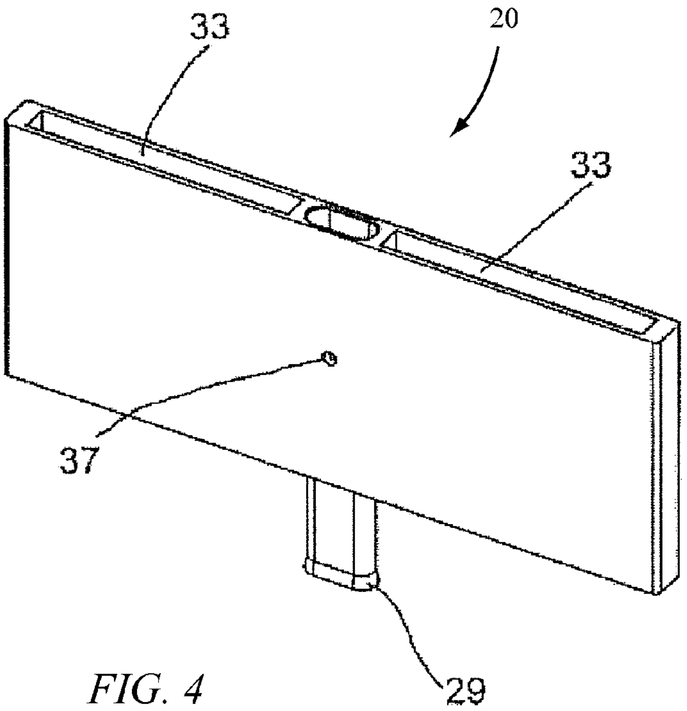
FIG. 4 illustrates a perspective view of a second component of a dispenser according to particular embodiments of the invention.
Figure 5:
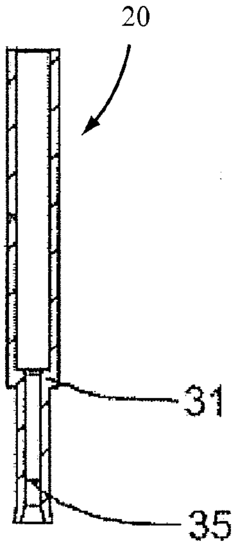
FIG. 5 illustrates a side view of a second component of a dispenser according to particular embodiments of the invention.
Figure 6:
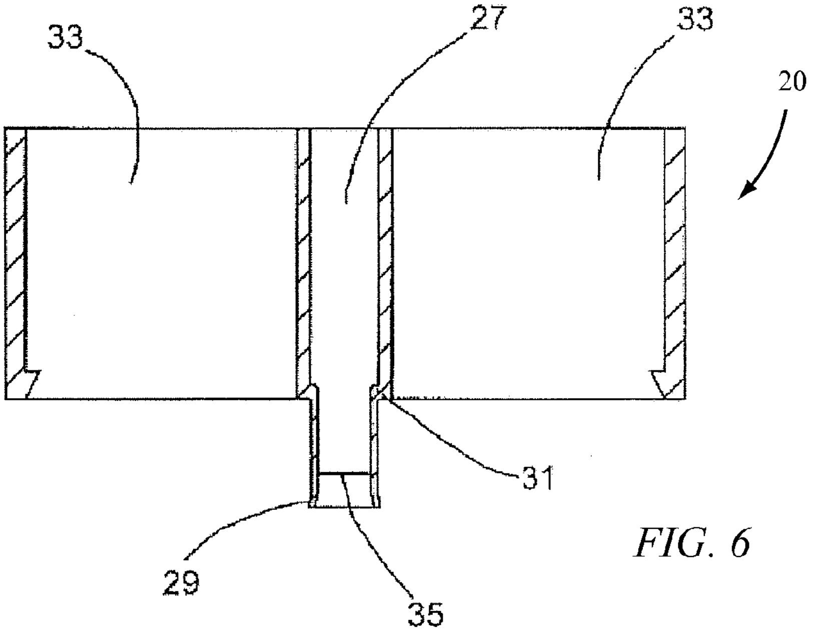
FIG. 6 illustrates a front view of a second component of a dispenser according to particular embodiments of the invention.

A second component 20 of a flat pump according to embodiments of the invention is illustrated in FIGS. 4 through 6. The second component 20 may include a second tubular section 27. In some embodiments, the second tubular section 27 may be fitted inside of the first tubular section 11 and may move respective to the first tubular section 11. In other embodiments, the second tubular section 27 may fit outside of the first tubular section 11 and may move relative thereto. In some instances, the second tubular section 27 or first tubular section 11 may include a sealing lip 29 such as that illustrated in FIGS. 4 through 6. A sealing lip 29 may create a seal between the first tubular section 11 and the second tubular section 27 when they are fitted together. The second tubular section 27 may also include one or more valve seats 31 which may include a small step portion on an interior of the second tubular section 27.

The second component 20 may also include one or more lateral tubular sections 33 on the sides of the second tubular section 27. The lateral tubular sections 33 may be configured to allow the second component 20 and the first component 10 to be fitted together. In addition, the lateral tubular sections 33 may include one or more teeth or indentations that may be able to mate with, or otherwise fit with, the arms 17 of the first component 10.

According to some embodiments of the invention, a sealing membrane 35 may be located on one end of the second tubular section 27 or within the interior of the second tubular section 27. The sealing membrane 35 may act as a seal when the first component 10 and second component 20 are fitted together. For example, when a second tubular section 27 is inserted in a first tubular section 11, the sealing membrane 35 may prevent gases or fluids in the reservoir 3, valve 19, or pump chamber 21 of the first component 10 from being released through the second tubular section 27. If the sealing membrane 35 is broken, however, fluids and gases may be able to flow through the second tubular section 27 from the first tubular section 11. For instance, if the second tubular section 27 is inserted in the first tubular section 11 such that the projection 25 and sealing membrane 35 intersect, the projection 25 may pierce or otherwise break the sealing membrane 35.

The second component 20 may also include one or more orifices 37. The one or more orifices 37 may be positioned or located on one of the principal faces of the second component 20 and may be configured to provide a passageway from an interior of the second tubular section 27 to the exterior of the second component 20. The one or more orifices 37 according to embodiments of the invention may be angled or positioned in a manner to produce a directional spray out the orifice 37. For example, an orifice 37 may provide a spray generally perpendicular to a surface of the second component 20. In other embodiments, the angle of an orifice 37 may be adjusted to provide a directional spray in the desired angle.

As illustrated in FIG. 5, the second component 20 of the flat pump may have a substantially flat profile.

A third component 30 of a flat pump according to embodiments of the invention is illustrated in FIGS. 7 through 11. The third component 30 may include a rod 39 which may be flat or otherwise shaped to fit within the second tubular section 27. A lower extremity of the rod 39 may include a first elastic spring 41 and an exhaust valve 43. The third component 30 may also include one or more second elastic springs 51. The rod 39 may be attached to a top portion of the third component 30 which is also attached to the one or more second elastic springs 51.

According to particular embodiments of the invention, the rod 39 of the third component may be fitted into the second tubular section 27 of the second component 20. The shape of the rod 39 may be configured to fit within the second tubular section 27 and two or more surfaces of the rod 39 may contact interior surfaces of the second tubular section 27. When inserted into the second tubular section 27, the exhaust valve 43 connected to the rod 39 by the first elastic spring 41 may rest or otherwise fit or mate with the valve seat 31 in the second tubular section 27. When the third component 30 is fitted with the second component 20, the first elastic spring 41 may provide sufficient force to moveably seal the exhaust valve 43 with the valve seat 31. A force applied to the exhaust valve 43 may move the exhaust valve 43 by collapsing or compacting the first elastic spring 41. For example, if the second component 20 and third component 30 are fitted to the first component 10 and the second component 20 is moved to actuate the flat pump, the projection 25 in the first component 10 may contact the exhaust valve 43 and impart force to the first elastic spring 41 which may give way, opening the exhaust valve 43. Once open, the exhaust valve 43 may allow fluid or gases from within the first tubular chamber to pass into the second tubular section 27 and by the valve seat 31.

Figure 11:
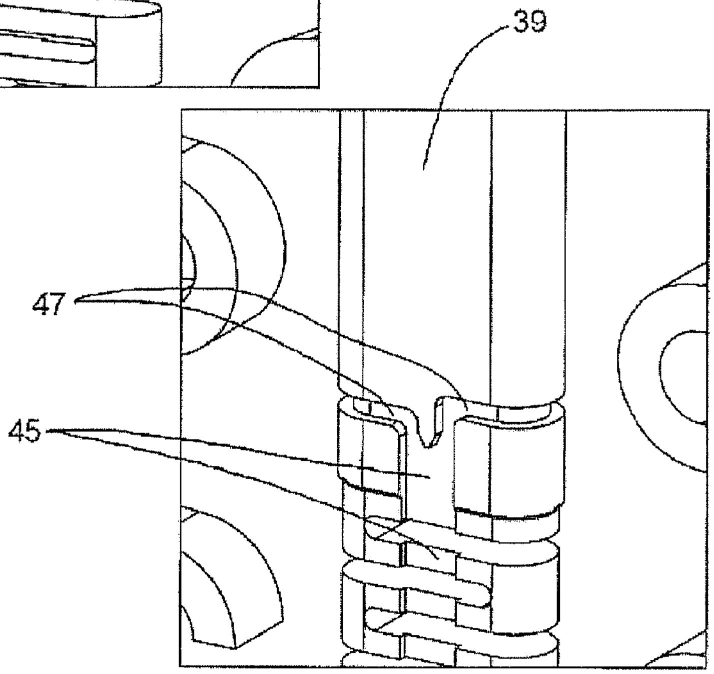
FIG. 11 illustrates an enlarged perspective view of a portion of the third component of a dispenser according to embodiments of the invention.

The rod 39 and first elastic spring 41 may also include an exhaust conduit 45. The exhaust conduit 45 may include an open channel on an exterior surface of the rod 39 as illustrated in FIG. 11. When the rod 39 is inserted into the second tubular section 27 the rod 39 surface becomes flush with an interior surface of the second tubular section 27 and the exhaust conduit 45 forms a tube through a portion of the second tubular section 27. Fluid may travel through the exhaust conduit 45.

Figure 10:
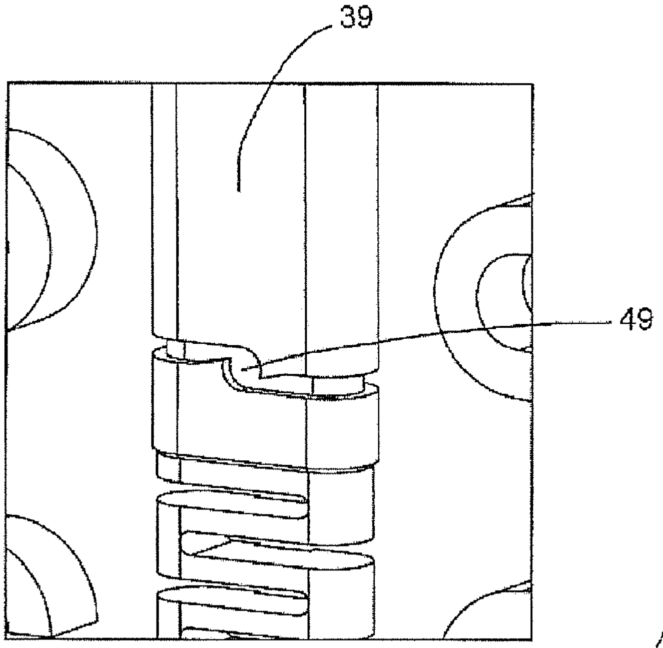
FIG. 10 illustrates an enlarged perspective view of a portion of the third component of a dispenser according to embodiments of the invention.

The exhaust conduit 45 may open into one or more bifurcated branches 47 in the rod 39. The bifurcated branches 47 may terminate in a vortex chamber 49 as illustrated in FIG. 10. In some embodiments of the invention, the bifurcated branches 47 may encircle at least a portion of the rod 39 and the vortex chamber 49 may be located on a surface of the rod 39 opposite the surface of the rod 39 in which the exhaust conduit 45 is located.

The vortex chamber 49 may include a chamber having a symmetrical shape. For example, the vortex chamber 49 may have a cylindrical, circular, hemispherical, conical or other shape. One or more inlets into the vortex chamber 49 may conduct fluid passing through the bifurcated branches 47 into the vortex chamber 49. In some embodiments, the inlets are off-center with respect to an axis of revolution produced by the vortex chamber 49. Liquid injected into the vortex chamber 49 may acquire a rotational motion which may cause the liquid to atomize.

In various embodiments of the invention, the first elastic spring 41, exhaust valve 43 and rod 39 may all be formed in a single component. The combination of components reduces the number of parts in the flat pump. In addition, the first elastic spring 41, exhaust valve 43, and rod 39 may be made of the same material. For example, the third component 30 may be formed from molded or moldable plastic material.

Figure 7:
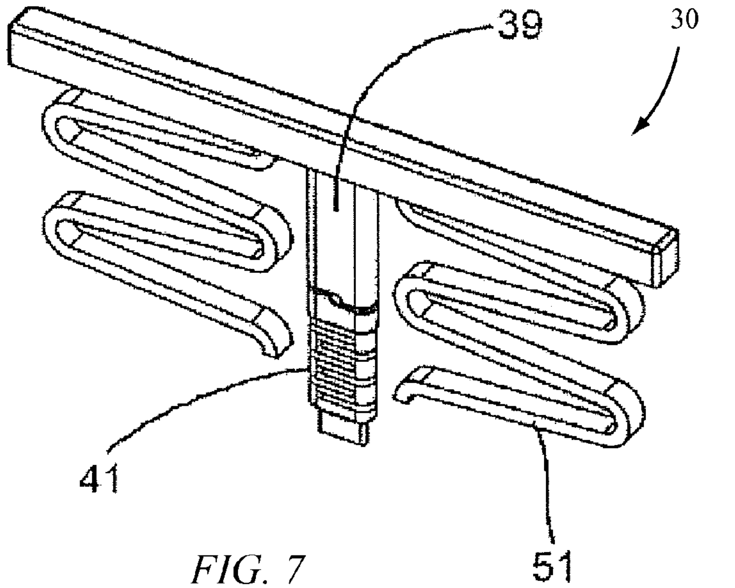
FIG. 7 illustrates a perspective view of a third component of a dispenser according to embodiments of the invention.
Figure 8:
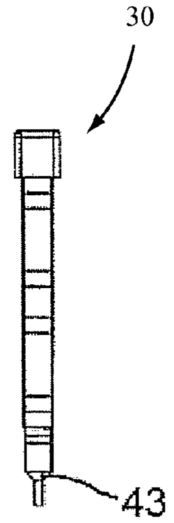
FIG. 8 illustrates a side view of a third component of a dispenser according to embodiments of the invention.
Figure 9:
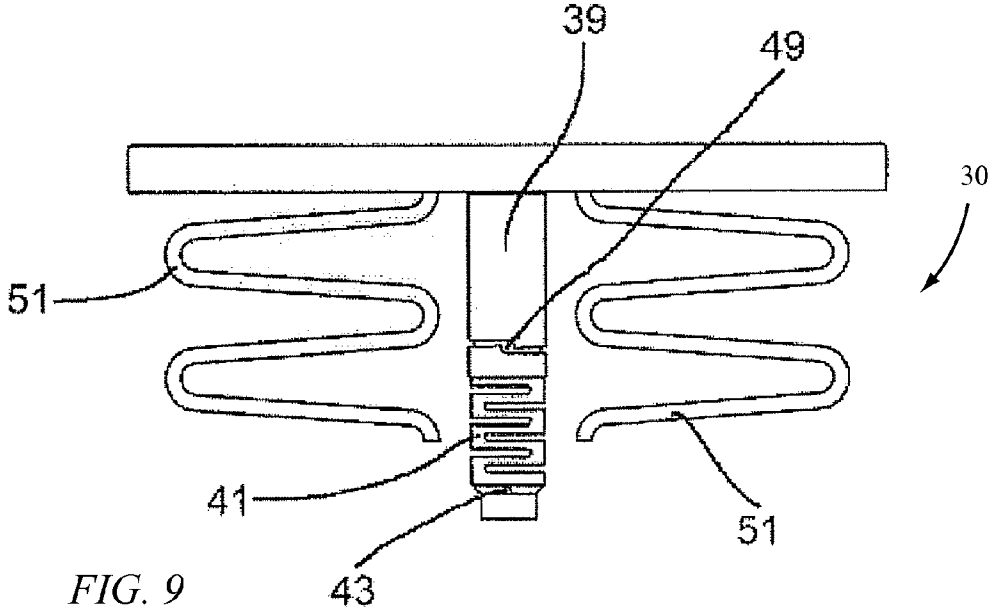
FIG. 9 illustrates a front view of a third component of a dispenser according to embodiments of the invention.

According to embodiments of the invention, the second elastic springs 51 may include any type of spring mechanism. As illustrated in FIGS. 7 and 9, the second elastic springs 51 may include extended plastic pieces formed in a zig-zag pattern. Other patterns may also be used to form the second elastic springs 51. For example, the second elastic springs 51 may include convex or concave arms which may flex and provide a spring force when pressed against another surface. The second elastic springs 51 may fit into a lateral tubular section 33 of the second component 20 and may contact the first component 10 in or through the lateral tubular sections 33.

Figure 12:
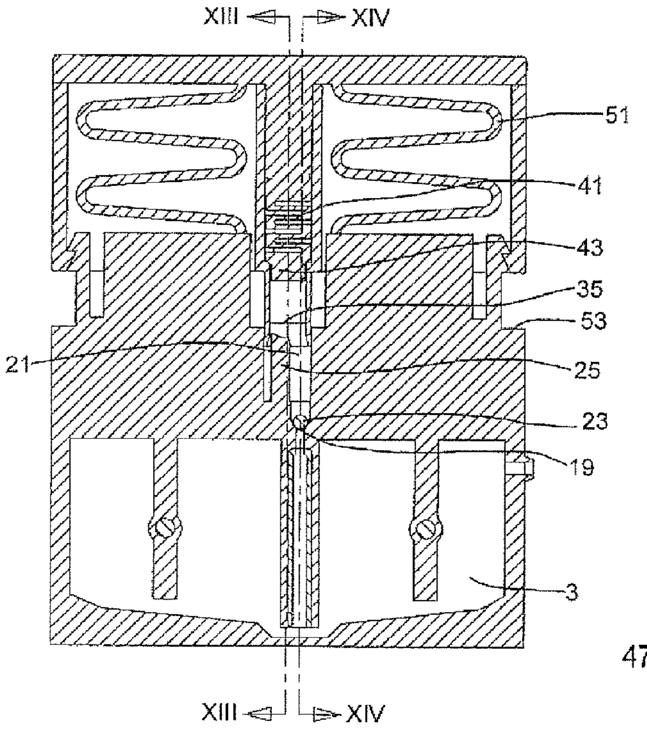
FIG. 12 illustrates a front view of an assembled dispenser according to embodiments of the invention.
Figure 13:
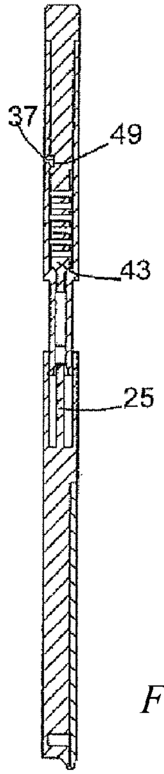
FIG. 13 illustrates a cross-section view of the dispenser illustrated in FIG. 13 along section line XIII.
Figure 14:
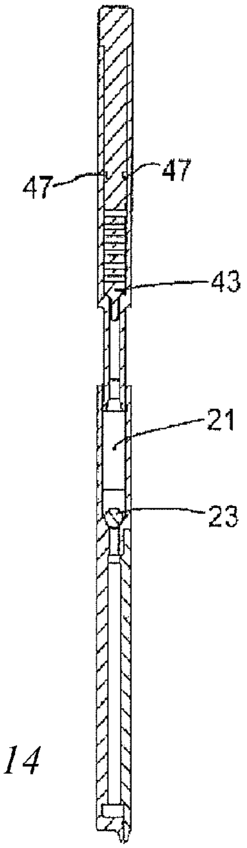
FIG. 14 illustrates a cross-section view of the dispenser illustrated in FIG. 13 along section line XIV.

A flat pump according to various embodiments of the invention is illustrated in FIGS. 12 through 14. In some embodiments of the invention, an assembled flat pump may have an initial position and an activated position. As illustrated in FIG. 12, an initial position includes a second component 20 in a first spring-catch position with the first component 10. The first spring-catch position is achieved where a tooth or indentation in the second component 20 is mated with, or otherwise fitted with, a first tooth or indentation of the first component 10. The sealing membrane 35 may not be broken in the first spring-catch position. The first spring-catch position may allow the flat pump to be assembled without providing an opening through which a fluid from the reservoir 3 may escape. The first spring-catch position may therefore be beneficial when transporting, storing, or otherwise distributing the flat pump. In addition, when the flat pump is in the first spring-catch position, the second elastic springs 51 may be in a tension-free position which saves the spring forces in the second elastic springs 51 until the flat pump is activated for use or moved into a second spring-catch position.

Upon activation of the flat pump, such as by compressing the first component 10 and the second and third components together, enough force is brought to bear on the second component 20 to overcome the resistance of the first spring-catch position. The tooth or indentations of the second component 20 may dislodge from the first teeth or indentations of the first component 10 and pass second teeth or indentations of the first component 10, creating a second spring-catch position. When the force is released, the second teeth or indentations of the first component 10 prevent the second component 20 from returning to the first spring-catch position. The second component 20 may be moved between the second spring-catch position and step 53, for example, in a pumping action. In addition, in certain embodiments, when the second component 20 is moved into a second spring-catch position, the projection 25 may pierce or otherwise break the sealing membrane 35, opening the flat pump for use. The exhaust valve 43 may also be moved during the movement of the second component 20 from the first spring-catch position to the second spring-catch position. Movement of the exhaust valve 43 may vent the flat pump and may lower the pressure in the pump chamber 21, allowing fluid from the reservoir 3 to be drawn through valve 19 into the pump chamber 21. When a downward force is again applied to the second and third components, the projection 25 may move the exhaust valve 43, allowing fluid to flow from the pump chamber 21 into the exhaust conduit 45, into the branches 47, into the vortex 49, and out orifice 37.

Figure 15:
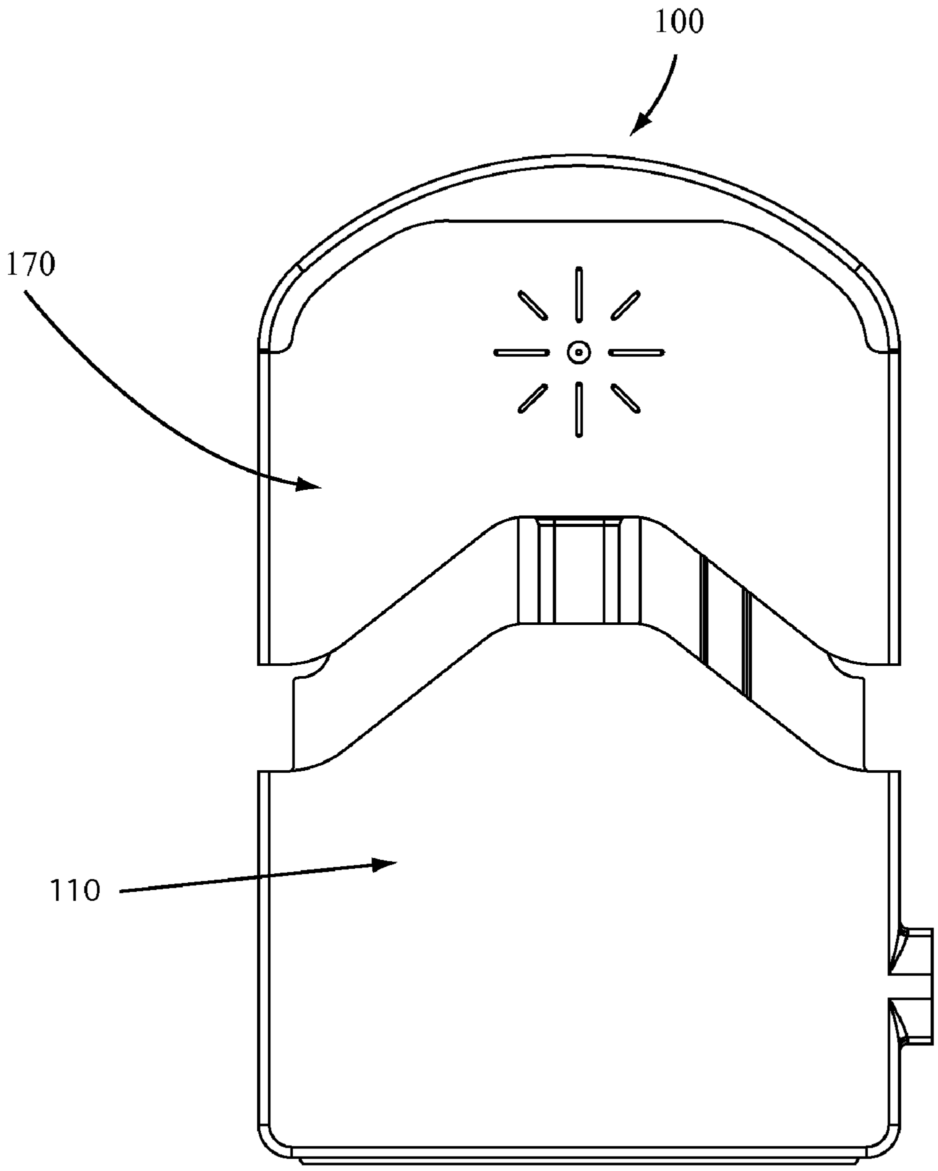
FIG. 15 illustrates a dispenser according to embodiments of the invention.

According to other embodiments of the invention, a dispenser 100, or flat pump, may include a body 110 and an actuator 170 as illustrated in FIG. 15. The body 110 may include a reservoir 115, a tube 120, a valve 125, and a pump chamber 130. The actuator 170 may include an exhaust conduit 175 and an orifice 180.

According to embodiments of the invention, a body 110 of a dispenser 100 may be substantially flat such that a thickness of the body 110 may be less than about 6 mm. In other embodiments of the invention, the thickness of the body 110 may be less than about 4 mm or even less than about 3.5 mm. For example, a dispenser 100 for distributing samples of perfume in magazines may include a body 110 having a thickness of about 3 mm or less in order to meet the size requirements for magazine inserts.

While body 110 thicknesses of about 6 mm or less may be desired for various applications, various embodiments of the invention may also include dispensers 100 having body 110 thicknesses greater than 6 mm. For instance, the thickness of a body 110 of a dispenser 100 may be customized according to the requirements of the application for which the dispenser 100 will be used.

Figure 16:
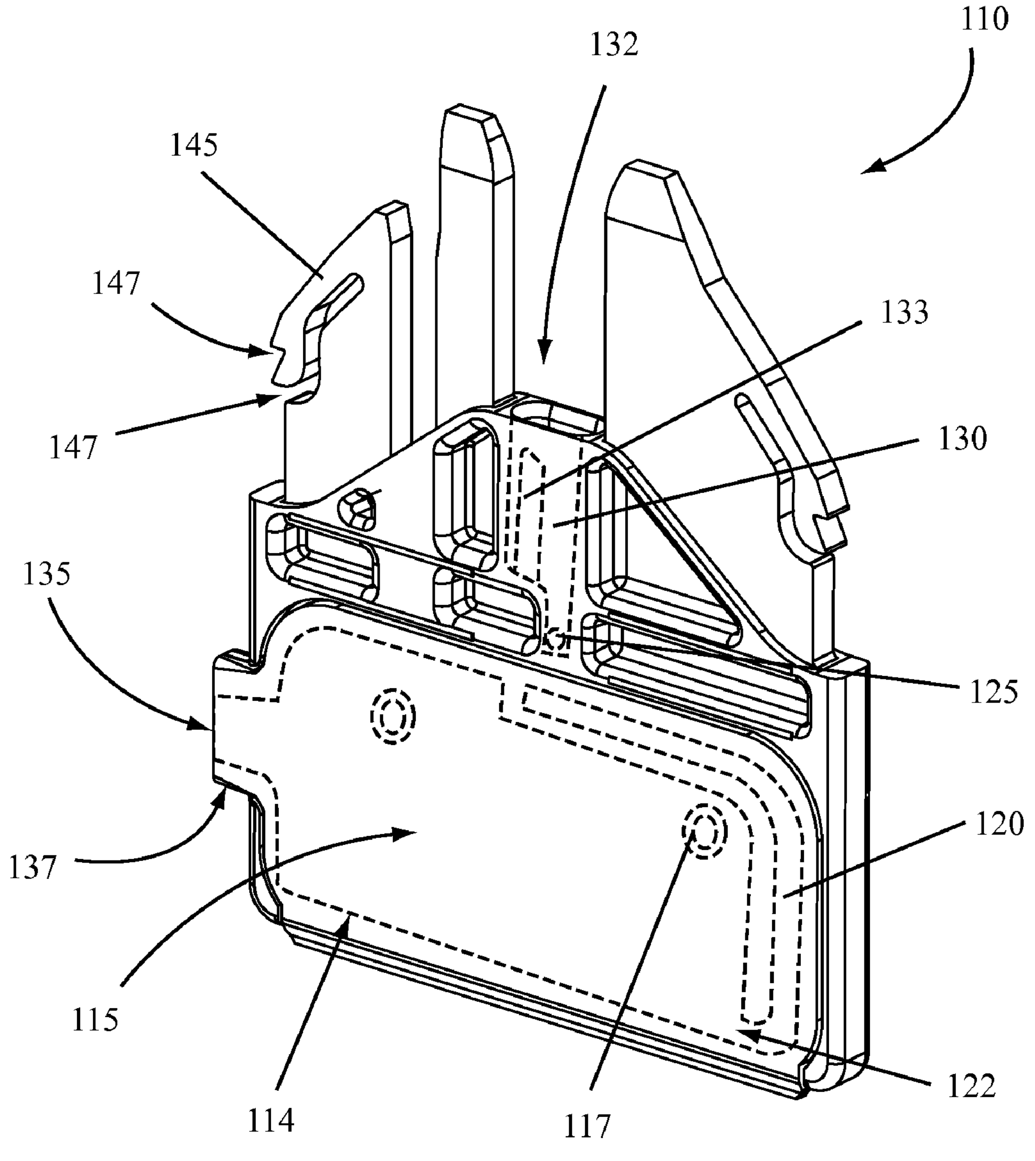
FIG. 16 illustrates a body component of a dispenser according to embodiments of the invention.

An assembled body 110 of a dispenser 100 according to various embodiments of the invention is illustrated in FIG. 16. The body 110 may include a reservoir 115, a tube 120, a valve 125, and a pump chamber 130. The reservoir 115 may include one or more hollow chambers within the body 110 of the dispenser 100. Each of the one or more hollow chambers may be configured to hold one or more fluids and to communicate a fluid being held in the reservoir 115 to the tube 120. For example, the reservoir 115 illustrated in FIG. 16 includes a hollow chamber within the body 110. A bottom surface 114 of the reservoir 115 may slope towards a first opening 122 in the tube 120 such that fluid in the reservoir 115 may flow down the bottom surface 114 of the hollow chamber to the first opening 122 when the dispenser 100 is held in a vertical position with the reservoir 115 on the bottom portion of the dispenser 100 as illustrated in FIG. 15. Reservoir support tabs 117 may also be included in the reservoir 115. The reservoir support tabs 117 may provide structural support to the reservoir 115 such that when forces are applied to opposing sides of the body 110 surrounding the reservoir 115, the reservoir support tabs 117 may absorb or resist at least some of the forces, preventing the reservoir 115 from collapsing or bursting open.

The body 110 may also include one or more openings 135 from an outer surface of the body 110 into the reservoir 115. The one or more openings 135 may be configured to allow a fluid to be introduced into the reservoir 115 of the body 110. According to some embodiments of the invention, the one or more openings 135 may also include one or more protruding flanges 137 which may be collapsed, melted, imploded, sealed or otherwise deformed to close the one or more openings 135. For example, a fluid may be introduced through the one or more openings 135 into the reservoir 115 to at least partially fill the reservoir 115 with the fluid. The protruding flanges 137 of the opening 135 may be ultrasonically welded, causing the protruding flanges 137 to melt and form a closure for the opening 135 sealing the fluid in the reservoir 115. In other embodiments, the one or more openings 135 may be closed or sealed using other methods and devices.

According to some embodiments of the invention, a valve 125 may be positioned between the reservoir 115 and a pump chamber 130. The valve 125 may limit an amount of fluid that may flow from the reservoir 115 to the pump chamber 130 and the direction of fluid flow. The valve 125, according to various embodiments of the invention, may include any type of valve that may be configured to regulate fluid flow through the valve. For example, the valve 125 may be a ball valve including a glass ball, steel ball, metal ball, plastic ball, or ball made of another material, which sits in the valve 125 and which may move to open or close the valve 125. The valve 125 may also be any other type of valve suitable for preventing unrestricted flow of a fluid from the reservoir 115 into the pump chamber 130, such as a flap valve.

Figure 17:
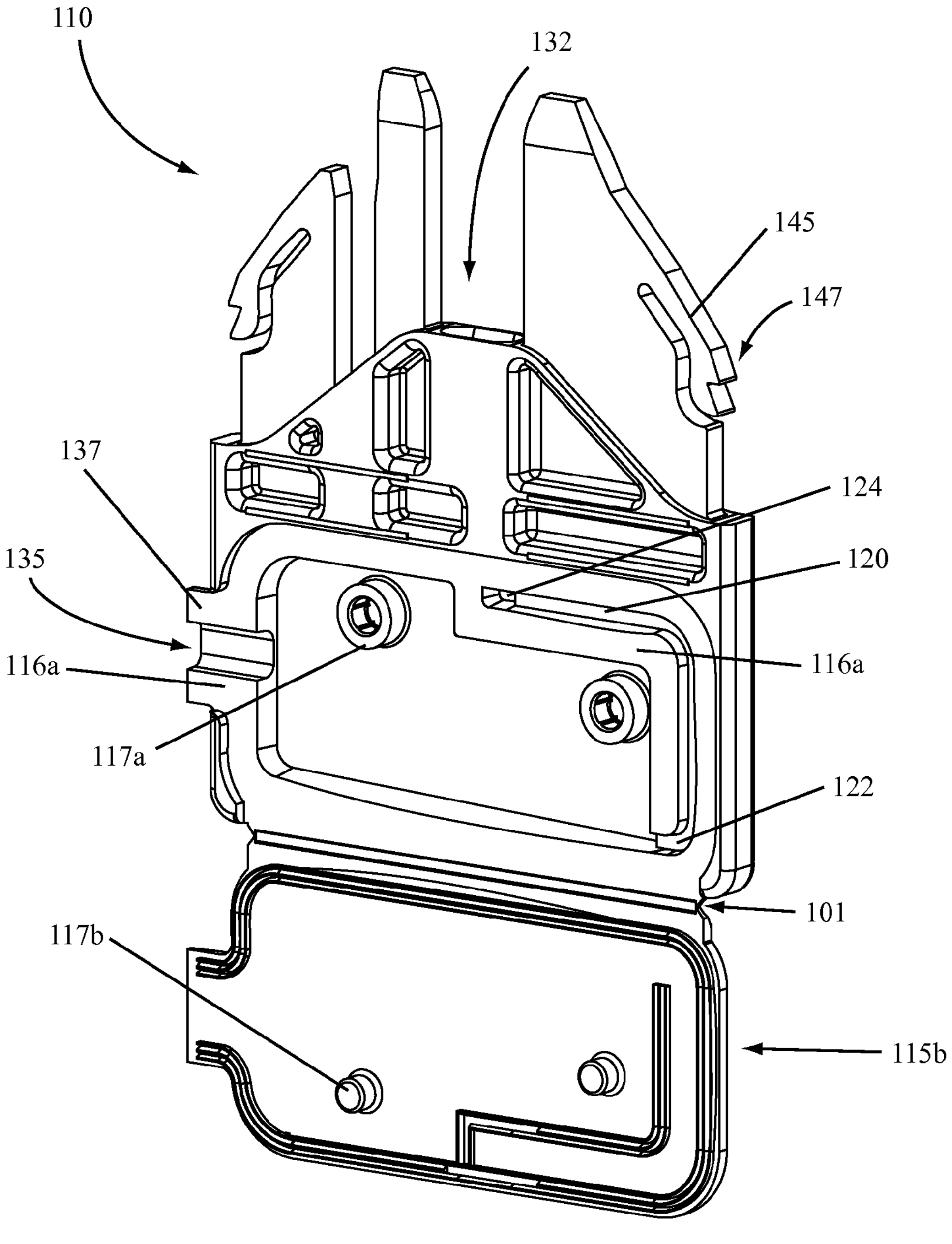
FIG. 17 illustrates an unassembled body component of a dispenser according to embodiments of the invention.

According to various embodiments of the invention, fluid from the reservoir 115 may be transported to the valve 125 through tube 120. The tube 120 may act as a conduit to deliver fluid from the reservoir 115 to the valve 125. The tube 120 may be positioned on a side of the reservoir 115 as illustrated in FIGS. 16 and 17, or in any other location within the reservoir 115. In some embodiments of the invention, the tube 120 may be a free-moving part, such as a dip tube, that may be positioned within the reservoir 115

The pump chamber 130 may receive and store fluid from the reservoir 115 that passes through valve 125 into the pump chamber 130. The size and configuration of the pump chamber 130 may be customized to hold a desired amount of fluid and to fill with a desired amount of fluid from the reservoir 115 upon actuation of the actuator 170 of a dispenser 100. According to some embodiments of the invention, the pump chamber 130 may include a tubular chamber defined in the body 110 as illustrated in FIG. 16. The pump chamber 130 may include a pump chamber opening 132.

One or more projections 133 or other structures may be positioned within the pump chamber 130. For example, a projection 133 may be positioned in the interior of the pump chamber 130 next to a wall of the pump chamber 130. The projection 133 may be positioned such that a portion of an actuator 170 may pass between a wall of the pump chamber 130 and a surface of the projection 133. When an object is inserted into the pump chamber 130, the object may encounter or contact the projection 133.

According to some embodiments of the invention, the body 110 may also include one or more indexing guides which may be used to facilitate proper assembly of a body 110 with an actuator 170 during automatic assembly of a dispenser 100, such as the dispenser illustrated in FIG. 15.

The body 110 may also include one or more arms 145. Each arm 145 may be equipped with one or more notches 147. The one or more notches 147 may interact with an actuator 170 to help maintain an assembled dispenser 100 in an assembled configuration. The one or more arms 145 may also act as springs. For example, as illustrated in FIG. 16, each arm 145 may include a projection which may flex or undergo movement when forces are applied to the arm 145. In other embodiments of the invention, the one or more notches 147 may be formed on fixed projections rather than arms.

A disassembled body 110 of a dispenser 100 according to some embodiments of the invention is illustrated in FIG. 17. The disassembled body 110 illustrated in FIG. 17 shows the reservoir interior 115*a* and a reservoir cap 115*b*. The reservoir interior 115*a* may include one or more interior reservoir support tabs 117*a* and one or more weld surfaces 116*a*. The reservoir cap 115*b* may include one or more cap reservoir support tabs 117*b* and one or more cap weld surfaces 116*b*.

The reservoir cap 115*b* may be folded along fold line 101 such that the cap weld surfaces 116*b* on the reservoir cap 115*b* at least partially contact one or more weld surfaces 116*a* on the reservoir interior 115*a*. When folded along fold line 101, the interior reservoir support tabs 117*a* may contact the cap reservoir support tabs 117*b* to form reservoir support tabs 117. When folded, the reservoir cap 115*b* and the reservoir interior 115*a* may be joined together. For example, the reservoir cap 115*b* and the reservoir interior 115*a* may be subject to ultrasonic welding, thermal welding, melting, heating, or other processes to seal the weld surfaces 116*a* with the cap weld surfaces 116*b*. The sealing of the weld surfaces 116*a* with the cap weld surfaces 116*b* may form a reservoir 115 as illustrated in FIG. 16.

According to other embodiments of the invention, the reservoir cap 115*b* need not be connected to the body 110. A reservoir cap 115*b* piece separate from the body 110 may be welded to the reservoir interior 115*a* in a similar manner as a reservoir cap 115*b* that is a part of the body 110 and is folded along fold line 101 can be welded to the reservoir interior 115*a*.

As illustrated in FIG. 17, the tube 120 of the body 110 may be defined by weld surfaces 116*a* and cap weld surfaces 116*b* which join or seal together leaving a tube 120, or passageway, having a first opening 122 and a second opening 124. The first opening 122 may transport fluid from the reservoir 115 into the tube 120. The second opening 124 may allow fluid from the tube 120 to be passed through the valve 125 of the body 110 and into the pump chamber 130. In other embodiments of the invention, a tube 120 may not be defined or formed by welded surfaces. For example, a dip tube may be used or inserted in the reservoir 115 prior to sealing of the reservoir 115 to communicate fluid from the reservoir 115 to the valve 125 of the body 110.

The opening 135 may also be defined by weld surfaces 116*a* and cap weld surfaces 116*b* when the reservoir cap 115*b* is folded along fold line 101. The weld surfaces may be welded together defining the opening 135.

Figure 18:
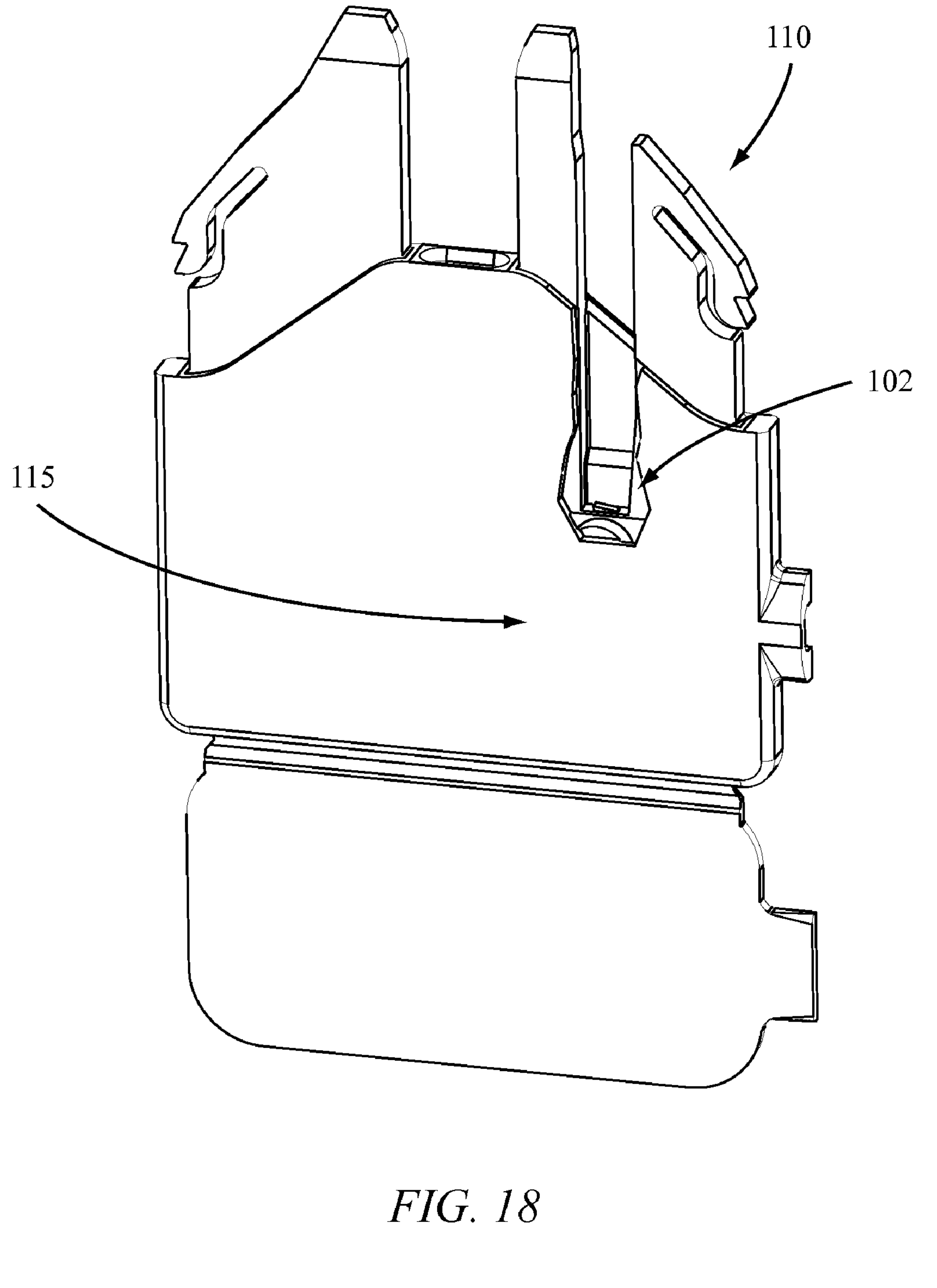
FIG. 18 illustrates a breakable seal for a reservoir of a dispenser according to embodiments of the invention.

According to some embodiments of the invention, the reservoir 115 of the body 110 may include one or more breakable seals 102 as illustrated in FIG. 18. The breakable seal 102 illustrated in FIG. 18 appears on a backside of the body 110 or on the opposite side of the body 110 than illustrated in FIG. 17. The placement of the breakable seal 102 may be moved or incorporated into other portions of the reservoir 115. The one or more breakable seals 102 may be broken to allow the reservoir 115 to vent during pumping. For instance, in some embodiments of the invention it may be desirable to allow the reservoir 115 to vent during actuation of the dispenser 100. The venting of the reservoir 115 may improve the operation of the dispenser 100. One method for providing the desired venting is to include a breakable seal 102 in the reservoir 115 which, once broken, will allow the reservoir 115 to vent. Other embodiments of the invention may incorporate other methods and devices for venting the reservoir 115.

According to particular embodiments of the invention, when the reservoir cap 115*b* is folded along fold line 101 and welded or otherwise connected to the reservoir interior 115*a*, the reservoir 115 is formed. The body 110, including the reservoir 115, may be substantially flat such that a thickness of the body 110 may be less than about 6 mm. In other embodiments of the invention, the thickness of the body 110 may be less than about 4 mm or even less than about 3.5 mm.

Figure 19:
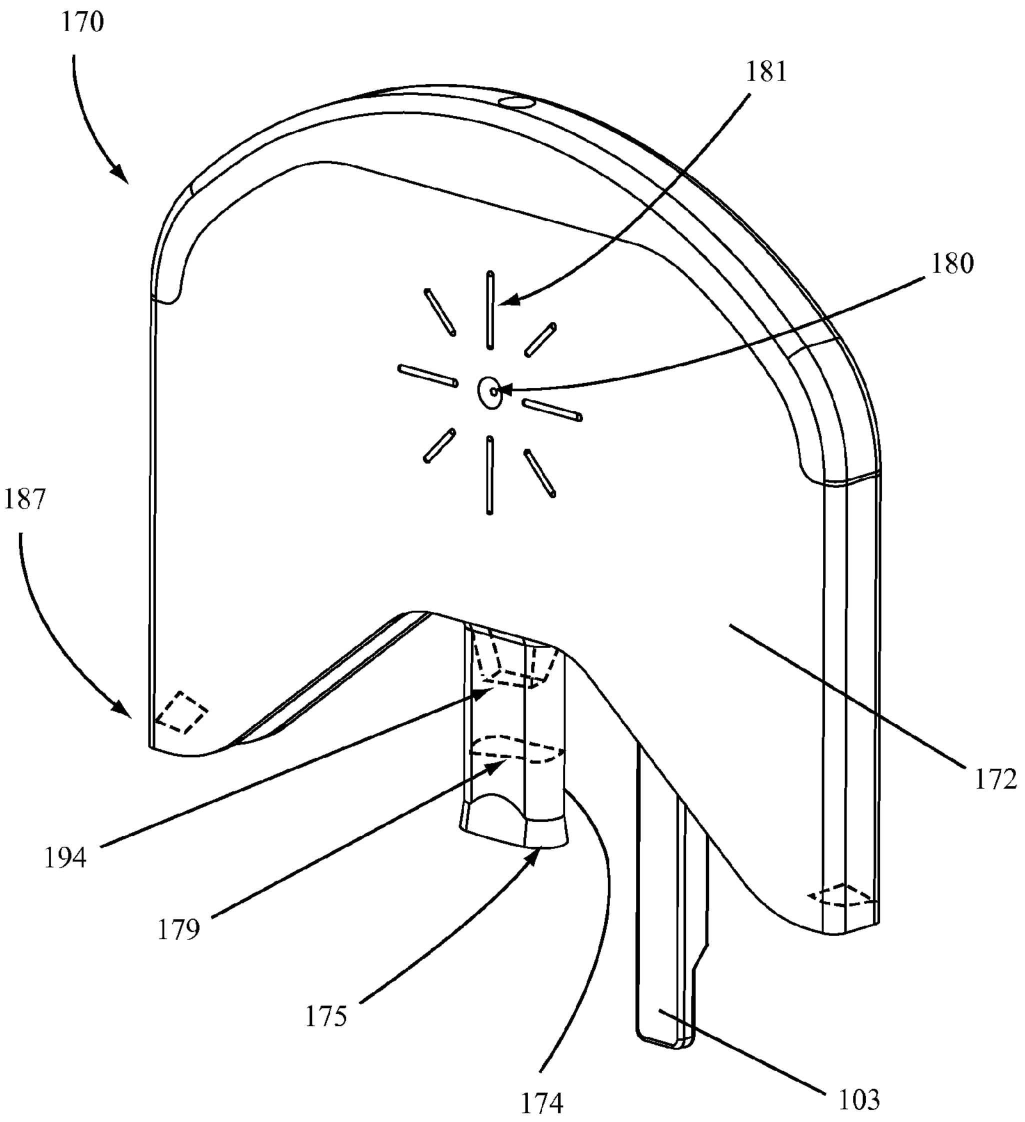
FIG. 19 illustrates an actuator for a dispenser according to embodiments of the invention.

According to embodiments of the invention, a dispenser 100 may also include an actuator 170 such as that illustrated in FIG. 19. The actuator 170 may be substantially flat such that a thickness of the actuator 170 may be less than about 6 mm. In other embodiments of the invention, the thickness of the actuator 170 may be less than about 4 mm or even less than about 3.5 mm. For example, a dispenser 100 for distributing samples of perfume in magazines may include an actuator 170 having a thickness of about 3 mm or less in order to meet the requirements for magazine inserts. In many embodiments, the actuator 170 may include a thickness that is substantially the same as the thickness of a body 110 to which the actuator 170 is attached.

The actuator 170 may include an actuator shroud 172 having an actuator tubular section 174. The actuator tubular section 174 may include a sealing lip 175 at one end of the actuator tubular section 174. The actuator 170 may also include a valve rod 194 and a sealing membrane 179 within the actuator tubular section 174 of the actuator 170. In some embodiments of the invention, the actuator 170 may also include an indexing guide which may or may not be attached to, or a part of, the actuator shroud 172. Actuators 170 according to embodiments of the invention may also include a protrusion 103 that may be used to break a breakable seal 102 in the body 110 of the dispenser 100. An orifice 180 may be located in the actuator shroud 172 or other portion of the actuator 170. Orifice markings 181 may be included on the actuator shroud 172 about an orifice 180 to visually identify a location of an orifice 180.

Figure 20:
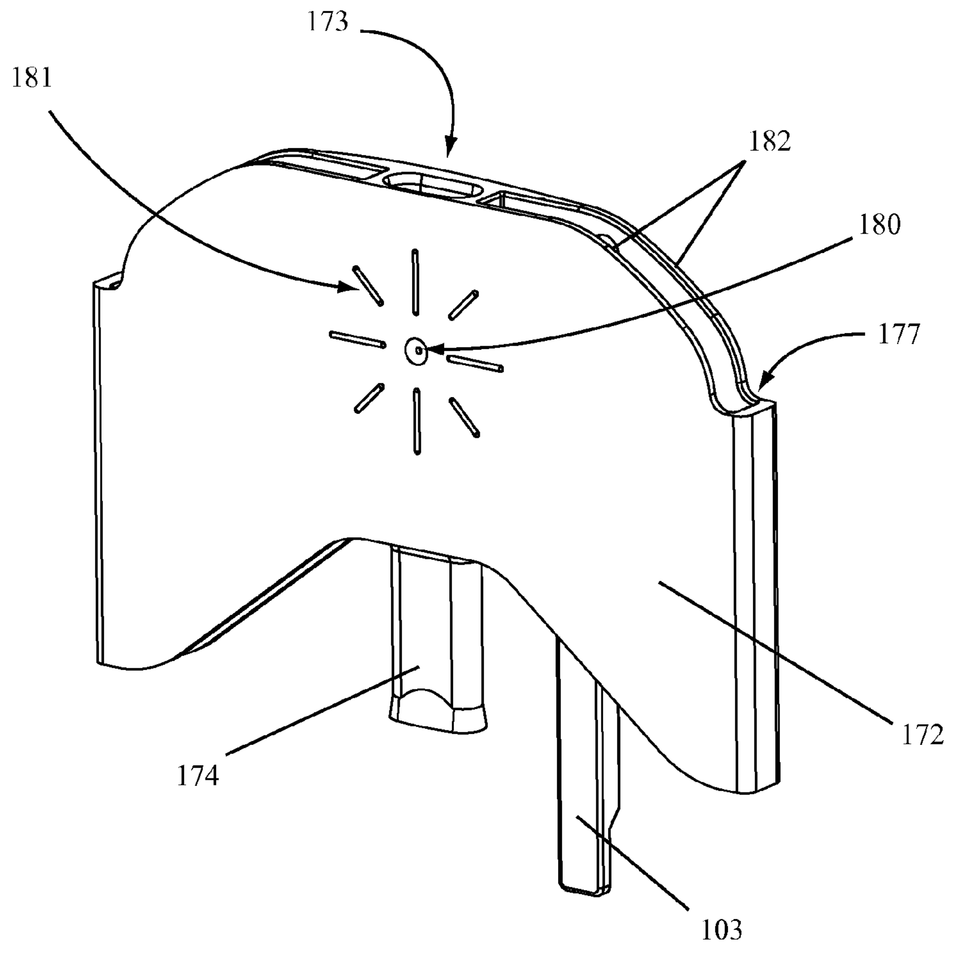
FIG. 20 illustrates an actuator shroud for a dispenser according to embodiments of the invention.

According to some embodiments of the invention, the actuator 170 may include two components: an actuator shroud 172 and a valve component 190. An actuator shroud 172 according to various embodiments of the invention is illustrated in FIG. 20. The actuator shroud 172 may include an actuator tubular section 174 having a sealing lip 175 at one end of the actuator tubular section 174 and an opening 173 at an opposing end of the tubular section 174. The actuator shroud 172 may also include shroud walls 182 defining openings within the actuator shroud 172. Actuator shrouds 172 according to embodiments of the invention may also include valve notches 177 which may be used to secure a valve component 190 in the actuator shroud 172. The actuator shroud 172 may also include body notches 187 which may help to secure an actuator 170 to a body 110 of a dispenser 100. One or more orifices 180 may be positioned in the actuator shroud 172. The one or more orifices 180 may provide an opening from an exterior of the actuator shroud 172 to an interior of the actuator tubular section 174. The actuator shroud 172 may also include an indexing guide. In some embodiments, the actuator shroud may also include one or more sealing membranes 179 positioned within an interior space of the actuator tubular section 174. The actuator shroud 172 may also include orifice markings 180 to mark the location of orifices 180 in the actuator shroud 172. A protrusion 103 for breaking a breakable seal 102 in a reservoir may also be part of, or attached to, the actuator shroud 172.

Figure 21:
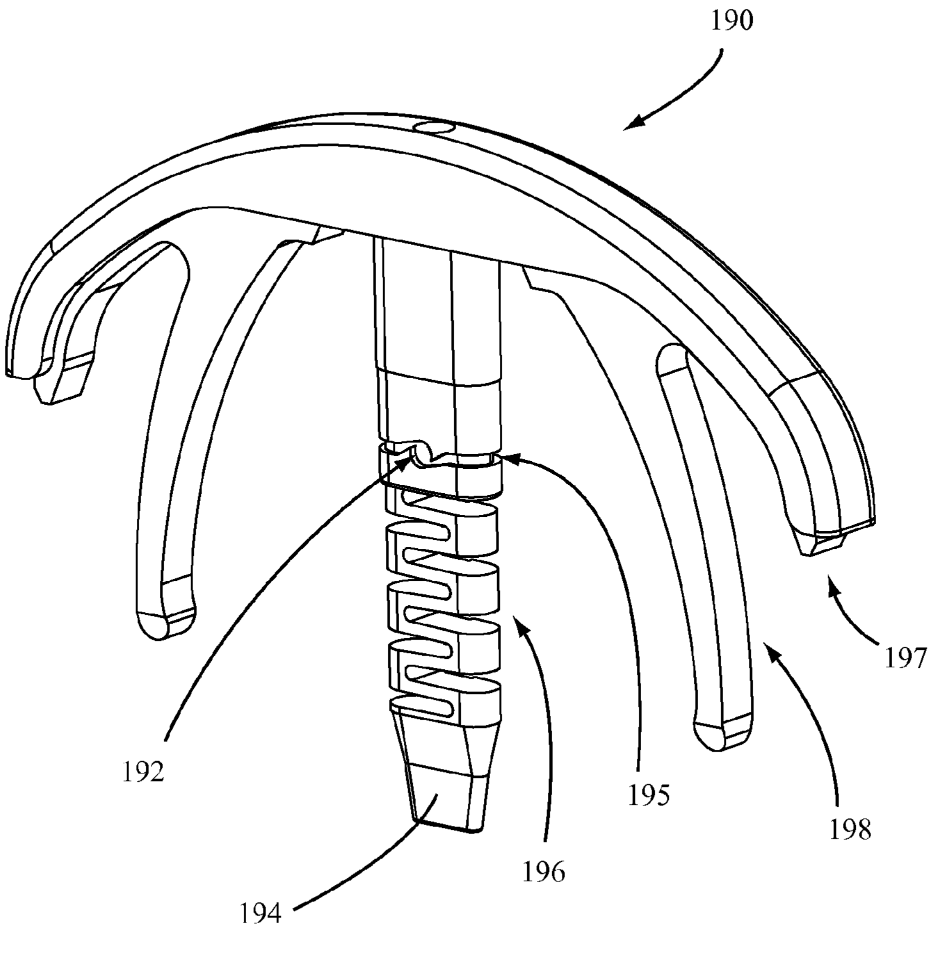
FIG. 21 illustrates a valve component for a dispenser according to embodiments of the invention.

A valve component 190 according to various embodiments of the invention is illustrated in FIG. 21. The valve component 190 may include a valve rod 194, one or more actuator springs 198 and one or more valve clips 197. The valve rod 194 may include one or more valve springs 196, one or more vortex chambers 192 and one or more valve conduits 195. The valve conduits 195 may run from one end of the valve rod 194 along at least a portion of the one or more valve springs 196 and terminate at the one or more vortex chambers 192.

According to embodiments of the invention, the valve component 190 illustrated in FIG. 21 may be inserted into the actuator shroud 172 illustrated in FIG. 20, to produce the actuator 170 illustrated in FIG. 19. For example, valve rod 194 may be inserted into opening 173 and actuator springs 198 may fit between shroud walls 182 such that they are positioned on an interior of the actuator shroud 172. Valve clips 197 may engage valve notches 177 in the actuator shroud 172 securing, or at least partially securing, the valve component 190 to the actuator shroud 172. In some embodiments, the actuator shroud 172 and the valve component 190 may also include indentations, holes, or projections that may be aligned and mated to each other to assist in maintaining a fit between the actuator shroud 172 and the valve component 190. In various embodiments of the invention, the one or more vortex chambers 192 in the valve rod 194 may align with the one or more orifices 180 in the actuator shroud 172. In particular embodiments of the invention, the insertion of the valve component 190 into the actuator shroud 172 to form the actuator 170 will not break a sealing membrane 179 positioned in the actuator tubular section 174.

According to various embodiments of the invention, a dispenser 100 as illustrated in FIG. 15 may be assembled by combining an actuator 170 as illustrated in FIG. 19 with a body 110 as illustrated in FIG. 16. In some embodiments, actuator indexing guides may be aligned with indexing guides of the body 110 to facilitate assembly of a dispenser 100.

Assembly of a dispenser 100 from an actuator 170 and a body 110 as illustrated in FIG. 15 may include the insertion of the actuator tubular section 174 into the pump chamber opening 132 such that at least a portion of the sealing lip 175 of the actuator 170 engages the walls of the pump chamber 130. Portions of the arms 145 of the body 110 fit between shroud walls 182 into an interior space of the actuator shroud 172. Body notches 187 on the actuator shroud 172 may engage or flex the arms 145 of the body 110, allowing the body notches 187 to slide into a mating position with a notch 147 of the body 110. Engagement of the body notch 187 with the notch 147 may be configured such that a sealing membrane 179 in the actuator tubular section 174 will not be penetrated or breached by a projection 133 in the pump chamber 130.

According to embodiments of the invention, the reservoir 115 of the dispenser 100 may be filled with a fluid. For example, a fluid may be dispersed into the reservoir 115 through opening 135. Any conventional filling process may be used to fill reservoir 115 with fluid. A filled, or partially filled, reservoir 115 may then be sealed to prevent fluid in the reservoir 115 from escaping through opening 135. For example, ultrasonic welding of the protruding flanges 137 may close and seal the reservoir 115 with fluid in the reservoir. The dispenser 100 may then be packed, shipped, distributed, or otherwise delivered.

Figure 22:
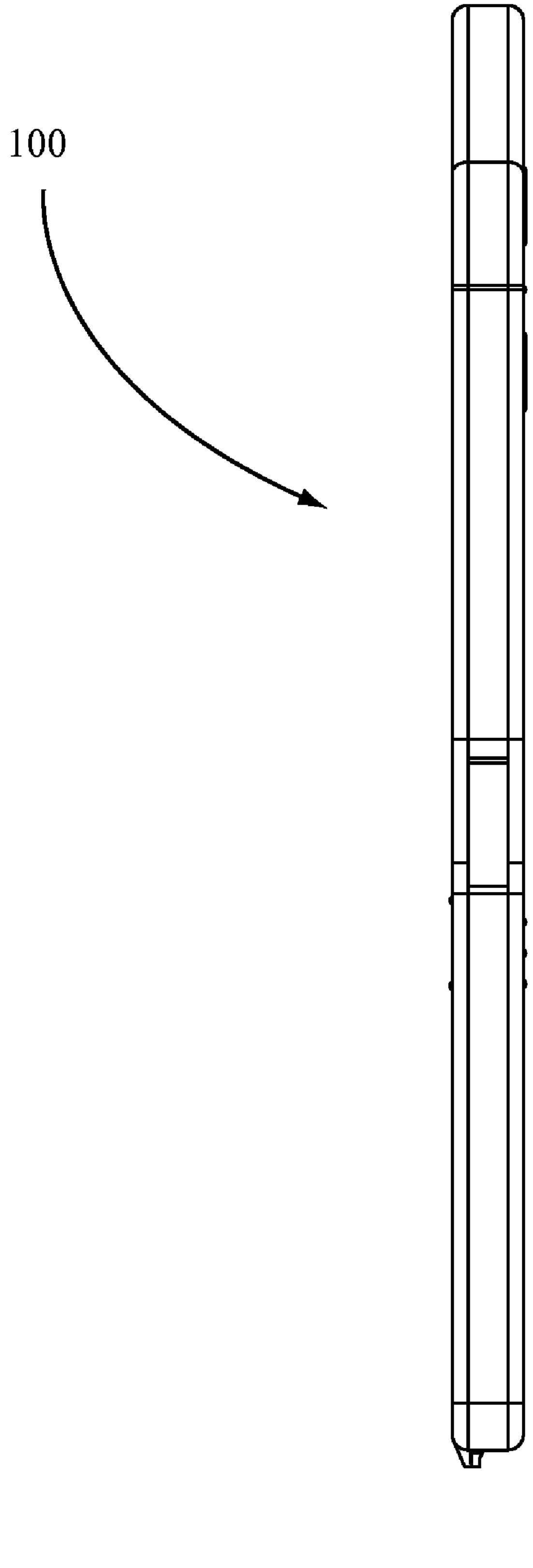
FIG. 22 illustrates a side profile view of a dispenser according to various embodiments of the invention.

According to embodiments of the invention, a dispenser 100 may be operated by pushing on the actuator 170, on the body 110, or on the actuator 170 and the body 110 to force the actuator 170 and body 110 together. For example, FIG. 21 illustrates a filled dispenser 100 according to embodiments of the invention. Upon application of a force to the actuator 170 in the direction of the body 110, the actuator 170 and body 110 slide together in an activated position as illustrated in FIG. 22. In the activated position, the actuator springs 198 and arms 145 of the body 110 flex against one another, producing a force counter to a force applied to the actuator 170. Release of the force applied to the actuator 170 may return the actuator 170 to the position relative to the body 110 illustrated in FIG. 21 due to the forces generated by the unflexing of the actuator springs 198 and the arms 145 of the body 110.

According to certain embodiments of the invention, when an actuator 170 of a dispenser 100 is first actuated, the body notches 187 of the actuator 170 may slide out of notches 145 and past a bottom lip of arms 145. Once the body notches 187 slide past the bottom lip of arms 145 they may be prevented from sliding back over the bottom lip of the arms 145. As the actuator 170 is actuated, the actuator tubular section 174 may be moved within the pump compartment 130. Movement of the actuator tubular section 174 within the pump compartment 130 may engage a sealing membrane 179 in the tubular section 174 with a projection 133 in the pump compartment 130. The engagement of the sealing membrane 179 with the projection 133 may break the sealing membrane 179. The breaking of the sealing membrane 179 may produce an opening through which a fluid may pass from the pump chamber 130 into a valve conduit 195 of the valve component 190. Fluid may travel along the valve conduit 195 from the pump chamber 130 into one or more vortex chambers 192 and out of one or more orifices 180.

In some embodiments of the invention, a protrusion 103 in the actuator 170 may also break a breakable seal 104 allowing reservoir 115 to vent. The venting of reservoir 115 may provide improved operation of the dispenser 100.

According to various embodiments of the invention, a dispenser 100, including the body 110 and actuator 170, may be made or constructed of any suitable material. For example, in some embodiments the body 110 may be a molded plastic part. In some embodiments the actuator 170 may also include molded plastic parts. In certain embodiments of the invention, the body 110 is a molded plastic part, the actuator shroud 172 is a molded plastic part, and the valve component 190 is a molded plastic part.

Dispensers 100 according to embodiments of the invention may be molded, shaped, assembled, and filled in any manner. For example, in some embodiments of the invention a body 110, an actuator shroud 172, and a valve component 190 may each be molded from a plastic or a resin. The body 110 may be assembled by folding the reservoir cap **115*b* along fold line 101 such that the cap weld surfaces 116*b* contact the weld surfaces 116*a*. The cap weld surfaces 116*b* and the weld surfaces 116*a* may be welded together such as by thermal welding, ultrasonic welding, the use of adhesives, or otherwise joining or sealing the two surfaces. The reservoir 115 formed in the body 110 may be filled through one or more openings 135. The protruding flanges 137 may be welded or sealed after the reservoir 115** is at least partially filled with a desired fluid.

The actuator shroud 172 and valve component 190 may be separately assembled to form the actuator 170.

The actuator 170 and the filled body 110 may be assembled such that arms 145 of the body fit between shroud walls 182 of the actuator shroud 172. In addition, the actuator tubular section 174 may be inserted into the pump chamber 130. One or more notches 147 of the body 110 may catch one or more of the body notches 187 in the actuator shroud 172, locking the actuator 170 in a first position. The dispenser may be shipped or otherwise distributed in such a position.

A dispenser 100 according to various embodiments of the invention is illustrated in FIG. 15. A side profile of a dispenser 100 according to various embodiments of the invention is illustrated in FIG. 22. As illustrated in FIG. 22, a dispenser 100 according to embodiments of the invention may be substantially flat.

According to some embodiments of the invention, a filled dispenser 100 may be sealed in a foil, plastic, or other liquid impermeable bag and inserted into a magazine. The magazine may then be distributed without the dispenser 100 leaking. For example, when the dispenser 100 is assembled in the position previously described, the sealing membrane 179 is still intact, preventing fluid from leaking from the dispenser 100. In addition, the reservoir support tabs 117 may help support the reservoir 115 during shipment such that the fluid in a filled dispenser 100 is not forced from the reservoir 115.

The dispenser 100 may also maintain a relatively constant shape and thickness during distribution because the dispenser 100 may be formed of a plastic material which will not significantly deform with the application of weight of mass on the dispenser 100. During distribution, the filled dispenser 110 remains in an inactive state. When the package is removed from the magazine and opened, a user may activate the dispenser 100 by forcing the actuator 170 and body 110 together in a pumping motion. The activation of the dispenser 100 may break the sealing membrane 179, partially exhaust the pump chamber 130 of air, and draw fluid into the pump chamber 130 from the reservoir 115. The next pumping action may open the valve conduit 195 and evacuate the pump chamber 130 of fluid. The fluid that flows through valve conduit 195 may flow into vortex 192 and out of an orifice 180.

Dispensers 100 according to various embodiments of the invention may have lower manufacturing costs than other dispensers. For example, the reduced costs may be realized because the dispensers 100 may be made of three molded plastic parts and a ball valve or other valve mechanism. In addition, the dispensers 100 may be mass distributed fairly inexpensively because, for example, they may be sent through the mail or distributed in a magazine or a newspaper. In addition, the integration of the vortex 192 into the valve component 190 reduces costs because a separate vortex is not needed.

Having thus described certain particular embodiments of the invention, the invention is not limited to these described embodiments. Rather, the invention is limited only by the appended claims, which include within their scope all equivalent devices or methods which operate according to the principles of the invention as described.

What is claimed is:

1. A flat pump, comprising:
- a first component, comprising:
  - a reservoir;
  - an intake valve;
  - a tube in communication with the reservoir and the intake valve; and
  - a first tubular section in communication with the intake valve;
- a second component, comprising:
  - a second tubular section; and
  - an orifice in the second tubular section;
- a third component, comprising:
  - a rod;
  - a first elastic spring in a lower extremity of the rod;
  - an exhaust conduit in at least a portion of the rod; and
  - a vortex chamber in communication with the exhaust conduit;
- wherein the rod is positioned in the second tubular section and the second component is moveably attached to the first component.

2. The flat pump of claim 1, wherein the first component further comprises:
- a flat piece; and
- a section overlying a portion of the flat piece, wherein the flat piece and section define the reservoir.

3. The flat pump of claim 2, wherein the flat piece further comprises tube walls and the section further comprises tube walls, wherein the intersection of the tube walls of the flat piece and the tube walls of the section form the tube.

4. The flat pump of claim 1, wherein the first component further comprises a ball seated in the intake valve.

5. The flat pump of claim 1, wherein a thickness of the flat pump is less than about 6 mm.

6. The flat pump of claim 1, wherein the first component further comprises a projection positioned in the first tubular section.

7. The flat pump of claim 1, wherein the first component further comprises at least one arm.

8. The flat pump of claim 7, wherein the at least one arm further comprises at least one tooth.

9. The flat pump of claim 1, wherein the first component comprises a molded plastic part.

10. The flat pump of claim 1, wherein the second component further comprises a sealing membrane in the second tubular section.

11. The flat pump of claim 1, wherein the second component further comprises at least one indentation for fitment with the first component.

12. The flat pump of claim 8, wherein the second component further comprises at least one indentation and wherein the at least one indentation communicates with the at least one tooth to fit the second component to the first component.

13. The flat pump of claim 1, wherein the second tubular section further comprises a sealing lip.

14. The flat pump of claim 1, wherein the second tubular section fits inside the first tubular section.

15. The flat pump of claim 1, wherein the first tubular section fits inside the second tubular section.

16. The flat pump of claim 1, wherein the second component comprises a molded plastic part.

17. The flat pump of claim 1, wherein the third component further comprises bifurcated branches between the exhaust conduit and the vortex chamber.

18. The flat pump of claim 1, wherein the third component further comprises at least one second elastic spring.

19. The flat pump of claim 1, wherein the third component comprises a molded plastic part.

20. The flat pump of claim 1, further comprising a fragrance contained in the reservoir.

21. A flat pump, comprising:
- a first component molded of plastic, comprising:
  - a reservoir;
  - an intake valve;
  - a tube in communication with the reservoir and the intake valve; and
  - a first tubular section in communication with the intake valve;
- a second component molded of plastic and fitted to the first component, comprising:
  - a second tubular section fitted inside the first tubular section;
  - a sealing lip on the second tubular section and in contact with an interior of the first tubular section; and
  - an orifice in the second tubular section;
- a third component molded of plastic and fitted to the second component, comprising:
  - a rod;
  - a first elastic spring in a lower extremity of the rod;
  - an exhaust conduit in at least a portion of the rod; and
  - a vortex chamber in communication with the exhaust conduit and adjacent the orifice.

* * * * *